United States Patent [19]

Quann

[11] Patent Number: 4,587,012

[45] Date of Patent: May 6, 1986

[54] PROCESS FOR UPGRADING HYDROCARBONACEOUS FEEDSTOCKS

[75] Inventor: Richard J. Quann, San Rafael, Calif.

[73] Assignee: Chevron Research Company, San Francisco, Calif.

[21] Appl. No.: 547,704

[22] Filed: Oct. 31, 1983

[51] Int. Cl.$^4$ .............................................. C10G 45/06
[52] U.S. Cl. ......................... 208/251 H; 208/216 PP; 208/216 R
[58] Field of Search ...................... 208/251 H, 216 PP

[56] References Cited

U.S. PATENT DOCUMENTS

| | | | |
|---|---|---|---|
| 3,027,231 | 3/1962 | Worel et al. | 502/439 |
| 3,392,125 | 7/1968 | Kelly et al. | 502/439 |
| 3,712,861 | 1/1973 | Rosinski et al. | 208/251 H |
| 3,876,523 | 4/1975 | Rosinski et al. | 208/216 PP |
| 3,947,347 | 3/1976 | Mitchell | 208/309 |
| 4,089,774 | 5/1978 | Oleck et al. | 502/314 |
| 4,136,063 | 1/1979 | Kimura et al. | 502/439 |
| 4,177,163 | 12/1979 | Oleck et al. | 208/216 PP |
| 4,186,078 | 1/1980 | Itoh et al. | 208/216 PP |
| 4,227,995 | 10/1980 | Sze et al. | 208/25 H |
| 4,341,625 | 7/1982 | Tamm | 208/216 PP |

Primary Examiner—John Doll
Assistant Examiner—Helane Myers
Attorney, Agent, or Firm—S. R. LaPaglia; Q. T. Dickinson

[57] ABSTRACT

A process for upgrading a hydrocarbonaceous feedstock employing an alumina-based catalyst at least a portion of which is in the alpha phase. The catalyst has at least 25% of its pore volume in pores from 300–1,000 Å in diameter, has no more than 10% macropores, and has a surface area of less that 100 m$^2$/g.

16 Claims, No Drawings

4,587,012

PROCESS FOR UPGRADING HYDROCARBONACEOUS FEEDSTOCKS

BACKGROUND OF THE INVENTION

1. Field of the Invention

The present invention relates to a process for upgrading a hydrocarbonaceous feedstock using a particular alumina-based catalyst. In a preferred embodiment, the invention relates to a process for removing metals contaminants and sulphur from a heavy hydrocarbonaceous feed, such as crude petroleum or petroleum residuum.

It is well known that various metallic elements are found in petroleum crude oil, most commonly, iron, nickle, and vanadium. These metals are harmful when included in feedstocks used for further refining operations. For example, in hydrocracking operations the plating out of iron metals on the catalyst exterior surfaces can over a time cause interstitial plugging of the catalyst bed. Further, deposition of nickel and vanadium on the interior of catalyst causes catalyst deactivation. Thus, efficient removal of contaminants, particularly metals contaminants, from a hydrocarbonaceous feedstock is a desired goal.

2. Description of the Prior Art

Heretofore, many types of catalyst have been proposed for upgrading hydrocarbonaceous feedstocks. Generally, such catalysts have had high surface areas and relatively small pore diameters or very low surface areas combined with high percentages of macropores.

For example, U.S. Pat. No. 4,227,995 discloses a process in which a metal containing hydrocarbon feedstock is contacted with hydrogen and a material characterized by low porosity, low surface area, less than 5 $m^2/g$, high average pore diameter, greater than 1,000 Å, and a high distribution of large pores, at least 40% of pores greater than 10,000 Å.

U.S. Pat. No. 3,712,861 discloses the upgrading of hydrocarbons containing sulfur and metal contaminants with a catalyst containing 0.5–20 wt % metal sulfides dispersed in an alumina. The catalyst is characterized with an average pore diameter of about 278 Å and a surface area of about 60–65 $m^2/g$.

U.S. Pat. No. 4,089,774 relates to a process for removing metal and sulfur contaminaints from residual oil fractions by contact with a catalyst comprising the sulfide of a Group VIB metal and iron group metal supported on an alumina that contains dispersed Delta and/or Theta phase alumina, the catalyst having at least 45% of its pore volume in pores 30 to 150 Å in diameter, at least 10% of its pore volume in pores least than 30 Å in diameter, and at least 15% of its pore volume in pores greater than 300 Å in diameter.

Finally, U.S. Pat. No. 3,947,347 discloses a process for removing metalliferous contaminants from the hydrocarbon feedstock by contacting the feedstock in the presence of hydrogen with an inert particulate solid having an average pore size in the range of from 1,000 to 10,000 Å and a surface area in the range of from 1 to 20 $m^2/g$.

SUMMARY OF THE INVENTION

The present invention relates to a process for upgrading a hydrocarbonaceous feedstock by contacting the feedstock in the presence of hydrogen under upgrading conditions with a catalyst comprising alumina, at least a portion of which is in the alpha phase, said catalyst having at least about 25% of its pore volume in pores from 300–1,000 Å in diameter, having no more than about 10% of its pore volume in pores greater than 1,000 Å in diameter, and having a surface area of less than about 100 $m^2/g$. The alumina-based catalyst may also contain a hydrogenation component selected from the group consisting of transition metals and combinations thereof.

DETAILED DESCRIPTION OF THE PREFERRED EMBODIMENTS

The present process is one for upgrading a hydrocarbonaceous feedstock. Representative feedstocks include petroleum crude oils, topped or reduced crude oils, solvent deasphalted oils, distillates, heavy cycled stocks, visbreaker liquid effluent, atmospheric and vacuum crude towered bottoms, shale oils, coal-derived liquids, tar sand oils, etc. Preferred feedstocks include crude petroleum and petroleum residuum which contain metal contaminants. Although the description herein is directed particularly to removing metals and sulphur from a petroleum feedstock, it is understood that the process of the invention is not so limited.

The catalyst used in the upgrading process of the present invention comprises alumina, at least a portion of which is in the alpha phase. Preferably, at least 35% and most preferably at least 80% of the alumina is in the alpha phase. The catalyst is further characterized by having at least about 25% of its pore volume in pores from 300–1,000 Å in diameter, very large micropores. Preferably, at least 40% and most preferably 80% of the pore volume is in these very large micropores. The catalyst is further characterized by having less than 10% of its pore volume in macropores 1,000 Å or greater. Finally, the catalyst has a low surface area, less than about 100 $m^2/g$, preferably about 20 to about 60 $m^2/g$, and most preferably about 35 $m^2/g$, with pore volume of about 0.3 g/cc.

Although it is not essential to the present invention, the alumina may be composited with a hydrogenating component if desired. If a hydrogenating component is present, it is generally selected from the group consisting of transition metals and combinations thereof, preferably the Co, Ni, Mo, and V. When the term "metal" is used herein to describe the catalyst, it is understood that the metal or metal component may exist in the final catalyst as the metal, as an inorganic compound thereof, or as a mixture of the metal and an inorganic compound or compounds thereof. Thus, the metal may exist as the oxide, chloride, sulfide, or the like.

The hydrocarbonaceous feedstock is contacted with the catalyst of the present invention under upgrading conditions which generally include a temperature from about 400° to 1,000° F., a pressure of from about 300 to 3,000 psig, and a LHSV of from about 0.1 to 10. For treating metal contaminated feedstocks, upgrading or demetallizing conditions include a temperature of from about 600° to 900° F., preferably from about 700° to 800° F., a pressure of from about 1,000 to 3,000 psig, preferably from about 1,500 to 2,800 psig, and a LHSV of from about 0.2 to 5.0, preferably from about 0.2 to 2.0.

The catalyst of the present invention may be used in many process and/or reactor configurations. For example, the catalyst may be slurried with the feed material. It may be used as a packed bed in a separate reaction zone or be used in the first part of a hydroprocessing reactor to act as a guard bed. In a preferred embodiment, the catalyst is part of a moving bed system as disclosed in commonly assigned U.S. patent application Ser. No. 514,758, filed July 18, 1983, incorporated by reference herein, and, more preferably, in a two-stage process in which the effluent from the upgrading or demetallizing zone is passed upwardly through a fixed bed of hydrocracking catalyst.

EXAMPLES

The following examples are included to illustrate the present invention and are not intended to be a limitation thereon.

EXAMPLE 1

An alumina catalyst in accordance with the present invention was prepared from a spherical alumina base having the following characteristics: 1/16" in diameter, 80% alpha alumina, 10% Theta alumina and 10% Kappa alumina, a particle density of 1.283 g/cc, a BET surface area of 36 m²/g, and a pore size distribution similar to the resulting catalyst.

2.45 g of $CoCO_3$ was added to 11.3 ml of phosphomolybdic acid at 100°–110° F. The solution was cooled to 80° F. and then diluted to 160 ml total with distilled water. 300 g of the above base material was impregnated by the spray pore fill method and allowed to stand for 20–25 hours. The material was dried at 250° F. for 1 hour and then calcined for 18 hours to 950° F.

The catalyst thus prepared (Catalyst A) had a particle density of 1.283 g/cc, a skeletal density of 3.752 g/cc, a surface area of 36 m²/g (measured by the BET method), a pore volume of 0.513 ml/g, and was 80% alpha alumina, 10% Theta alumina, and 10% of Kappa alumina. Catalyst A also contained 0.4% Co and 1.2% Mo by weight.

Catalyst B was prepared by a similar method to Catalyst A but using a different alumina base. Catalyst B had a skeletal density of 3.512 g/cc, a particle density of 1.262 g/cc, a BET surface area of 60 m²/g, a pore volume of 0.508 ml/g, and was 35% alpha alumina, 50% Theta alumina and 15% Kappa alumina. Catalyst B also contained 1.0% Co and 3.0% Mo by weight.

Table I shows the pore distribution of Catalysts A and B as measured by mercury porosimetry.

TABLE I

| Pore Diameter in Å | % of Pore Volume | |
| --- | --- | --- |
| | Catalyst A | Catalyst B |
| <200 | 6.9 | 25.6 |
| 200–300 | 13.1 | 48.2 |
| 300–400 | 14.1 | 15.6 |
| 400–600 | 18.8 | 8.2 |
| 600–800 | 25.9 | 1.8 |
| 800–1000 | 14.1 | 0.6 |
| <1000 | 7.1 | 2.0 |

EXAMPLE 2

A Maya atmospheric residuum feed having the specifications listed in Table II was contacted in separate runs with each of Catalysts A and B in a tubular flow reactor at a temperature of 760° F., a total pressure of 2,000 psig, a hydrogen partial pressure of about 1,800 psig, and a LHSV of 0.75. The product inspections are also shown in Table II. Product A and Product B are the products from using Catalyst A and Catalyst B, respectively.

TABLE II

| | Sulphur in wt % | Vanadium in ppm | Nickel in ppm |
| --- | --- | --- | --- |
| Feed | 4.5 | 390 | 61 |
| Product A | 2.9 | 120 | 42 |
| Product B | 2.9 | 121 | 39 |

From the results obtained with Catalyst A, it can be seen that by employing a catalyst in accordance with the present invention, it is possible to achieve more than 0.65 g/cc of reactor of Ni+V demetallation. It was heretofore generally believed to be impossible to achieve this or a better result with any other catalyst without appreciable deactivation.

Catalyst A was run for about 3,350 hours under the conditions shown in Example 2 and lost only about 20% of its initial activity for demetallation.

Although one specific embodiment of the present invention has been described above, it should be understood that this embodiment is described for illustrative purposes only and that numerous alterations and modifications can be practiced by those skilled in the art without the parting from the scope of the invention. Accordingly, it is the intent that the present invention not be limited by the above, but be limited only as defined in the appended claims.

What is claimed is:

1. A process for upgrading a hydrocarbonaceous feedstock comprising contacting the feedstock in the presence of hydrogen under upgrading conditions with a catalyst comprising alumina, at least 35% of which is in the alpha phase, said catalyst having at least about 25% of its pore volume in pores from 300–1,000 Å in diameter, having no more than about 10% of its pore volume in pores greater than 1,000 Å in diameter and having a surface area of less than about 100 m²/g.

2. The process of claim 1 wherein at least 80% of the alumina is in the alpha phase.

3. The process of claim 1 wherein the catalyst has at least 40% of its pore volume in pores from 300 to 1,000 Å in diameter.

4. The process of claim 1 wherein the catalyst has at least 80% of its pore volume in pores from 300 to 1,000 Å in diameter.

5. The process of claim 1 wherein the catalyst has a surface area of from about 20 to about 60 m²/g.

6. The process of claim 1 wherein the catalyst has a surface area of about 35 m²/g.

7. The process of claim 1 wherein the feedstock is selected from the group consisting of metal contaminated petroleum crude oils, topped or reduced crude oils, solvent deasphalted oils, distillates, heavy cycle stocks, visbreaker liquid effluent, atmospheric and vacuum crude tower bottoms, shale oils, coal-derived liquids, and tar sand oils.

8. The process of claim 1 wherein upgrading conditions include a temperature of from about 400° to 1,000° F., a pressure of from about 300 to 3,000 psig, and a LHSV of from about 0.1 to 10.

9. The process of claim 1 wherein the feedstock contains more than 100 ppm of metals.

10. A process for removing metals contaminants from a heavy hydrocarbonaceous feedstock comprising contacting the feedstock in the presence of hydrogen under demetallizing conditions with a catalyst comprising alumina at least 35% of which is in the alpha phase, said catalyst having at least 40% of its pore volume in pores from 300–1,000 Å and having no more than 10% of its pore volume in pores greater than 1,000 Å and having a surface area of from about 20 to 60 m²/g.

11. The process of claim 10 wherein at least 80% of the alumina is in the alpha phase.

12. The process of claim 10 wherein the catalyst has at least 80% of its pore volume in pores from 300–1,000 Å.

13. The process of claim 10 wherein the catalyst has a surface area of about 35 m²/g.

14. The process of claim 10 wherein demetallizing conditions include a temperature of from about 600° to 900° F., a pressure of from about 1,000 to 3,000 psig, and a LHSV of from about 0.2 to 5.0.

15. The process of claim 10 wherein the catalyst contains from about 0.1 to 20 wt % of a hydrogenating component selected from the group consisting of transition metals and combinations thereof.

16. The process of claim 15 wherein the hydrogenating component is selected from the group consisting of Co, Ni, Mo, V, and their mixtures.

* * * * *